J. S. TOPHAM.
Improvement in Traveling-Bags and Handles.
No. 129,910. 3 Sheets--Sheet 1. Patented July 30, 1872.
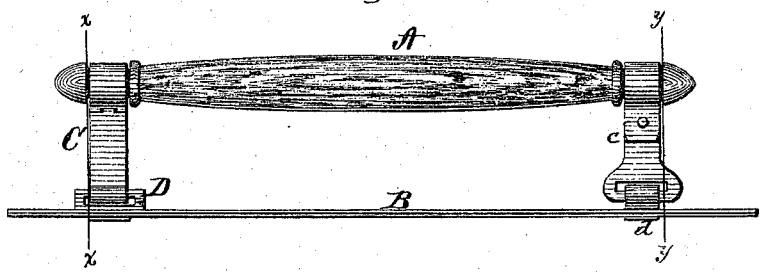
Fig. 1.
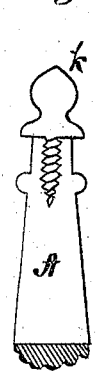 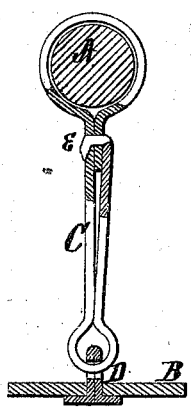 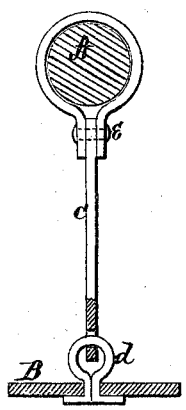 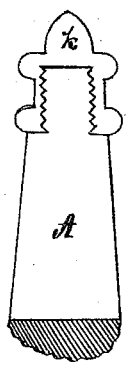
Fig. 19.  Fig. 2.  Fig. 3.  Fig. 20.
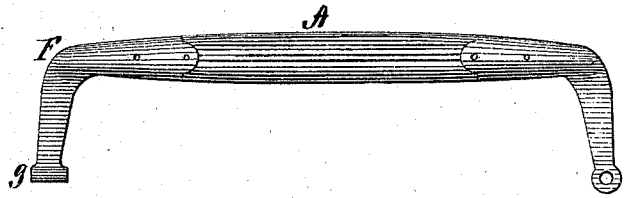
Fig. 4.
 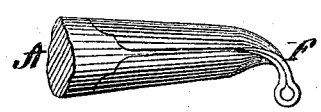
Fig. 5.  Fig. 6.
Witnesses.
Harry King.
Edw. F. Brown.
Inventor.
James S. Topham
per
Alexander Mason
Attorneys.

J. S. TOPHAM.
Improvement in Traveling-Bags and Handles.
No. 129,910. Patented July 30, 1872.
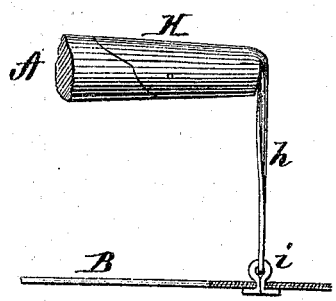
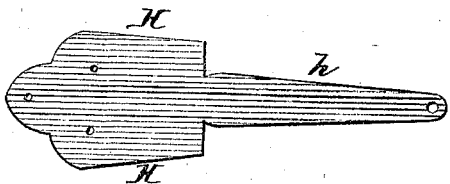
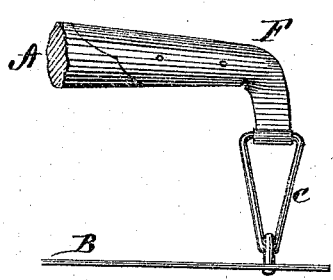
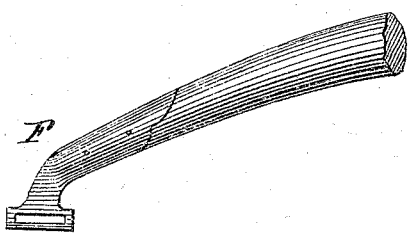
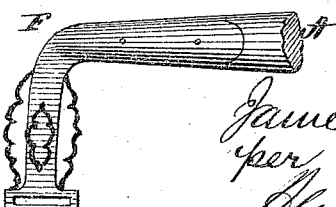
Witnesses.
Harry King
Edw. F. Brown
Inventor.
James S. Topham
per
Alexander Mason
Attorneys.

J. S. TOPHAM.

Improvement in Traveling-Bags and Handles.

No. 129,910.    Patented July 30, 1872.

UNITED STATES PATENT OFFICE.

JAMES S. TOPHAM, OF WASHINGTON, DISTRICT OF COLUMBIA.

IMPROVEMENT IN TRAVELING-BAG, &c., HANDLES.

Specification forming part of Letters Patent No. 129,910, dated July 30, 1872.

*To all whom it may concern:*

Be it known that I, JAMES S. TOPHAM, of Washington, District of Columbia, have invented certain new and useful Improvements in Handles for Traveling-Bags, Satchels, &c.; and do hereby declare the following to be a full, clear, and exact description thereof, reference being had to the accompanying drawing and to the letters of reference marked thereon making a part of this specification.

Traveling-bag handles are usually made of a piece of rope of the requisite length, the ends of which are tightly wrapped with twine to make the rivets hold. It is then wrapped with a covering of a long piece of paper or other material, cut broad or full at the center and narrowed down toward each end so as to give it the proper swell or thickness in the center and tapering toward each end. The whole is then finished by gluing or stitching on a cover of the same kind of leather the bag or satchel is to be made of. As thus made they seldom wear as long as the bag; being flexible, they soon get soft with use, the glue or stitching gives way, and the small or tapered ends, being only rope or other soft material and a thin outside covering, give way where riveted to the caps; also, being curved as well as flexible in order to attach them, the bearings are not direct and the weight comes upon the center, thus bearing unevenly on the hand and tiring it much quicker than where the bearings are all straight and direct.

My invention consists of a rigid straight bag or satchel handle of ivory, bone, horn, gutta-percha, metal, or other suitable material, or any two or more of them combined, and made plain or ornamental, with ornamental ends of metal, ivory, or other material, the whole provided with links or caps so constructed that when attached to the frame of the bag, pendent buckles, loops, or straps, all the bearings will be direct and at right angles, or nearly so, with the frame or handle, as will be more fully explained by reference to the accompanying drawing, and is intended as an improvement upon my rigid curved handle for which a patent was granted to me February 6, 1872, as it saves the cost of bending, and can be made from all the finer and ornamental woods that will bear a high finish, such as walnut, rose-wood, ebony, &c., but will not bear bending.

In Figure 1 I have shown a straight handle, A, tapered from the center to each end, with a raised bead and ornamental end in one piece, or with ornamental ends of different materials attached to the ends thereof by screws, rivets, or other suitable device. B is a portion of the frame, with a slot cut lengthwise to receive the shank of a loop, D, which loop is made of sheet metal, with a slot cut in it for the link C to pass through. After the shank is passed through the frame B it is opened and pressed up sharp against the under side of the frame, as shown in Fig. 2; or the loop D may be made of cast metal and riveted to the frame, either way making a very strong, secure, and easily-applied fastening. The link C is a straight piece of metal, of suitable width and length, passing around the handle A down through the loop D, forming an eye around it, then upward, and fastened by the end being made small enough to pass through a slot in the link near the handle and being clinched on the other side, as shown at E E, Fig. 2; or it may be cut off square and riveted by a small rivet.

In Fig. 3, at c, I have shown a modification of the link, with a slot across the lower end, which plays in the eye d, this eye being a straight piece of metal bent over to form an eye for the link c to play in, and attached to the frame B.

In Fig. 4 the handle A is made plain, to be used with metallic caps F, made of sheet metal, cut of the required pattern and bent in the middle, so that the ends, when brought together and made concave, will form a cap for receiving the end of the handle A, to which it is riveted. At the end is formed an eye, g, as shown more fully in Fig. 5. The shank of this cap is bent at a suitable angle with the cap, and is made sufficiently long to dispense with the link C, or the ring as at present used on the old style of leather handles. The plain handle is also made with the ends rounded off and a slot or mortise cut in the end, into which a plain or ornamental link of cast or sheet metal or other material is fastened by riveting or other suitable means. With gilt trimmings and a finely-polished rose-wood or walnut handle this style gives an elegant finish to a light satchel for ladies' use.

Figs. 6 and 11 show a modification of this cap, with the eye bent down at an angle with its cap, and having a short shank, and attached to the frame by a triangular or square link, c.

Fig. 13 shows a cap with an ornamental shank, which has a slot in the lower end for making a close connection with the frame B, the same as the link C in Fig. 1, which link may also be ornamental.

Fig. 12 shows a cap to be used with a rigid curved handle, and may be made with a short shank or a long ornamental one, as in Fig. 13.

Fig. 7 shows a more simple and cheaper form of cap, and gives a good finish to the end of the handle, as it does not show any seam, and is cut like the pattern shown in Fig. 8. The broad sides H of this pattern are bent around and lap over on the under side of the handle A, as shown in Fig. 9. The shank $h$ is made concave, to give it greater strength, and is provided with an opening in the end for the eye $i$ to play in and attach it to the frame B. This eye, as shown in Fig. 18, is formed of a piece of wire, and the ends are flattened so as to bend sharply and fit closely up against the inside of frame B.

Fig. 10 shows a mode of applying the same attachment of cap in Fig. 7 to the frame B as link C in Fig. 1.

Figure 16:
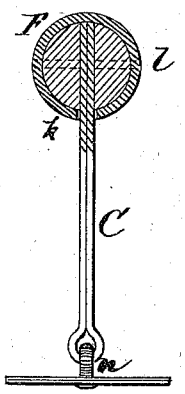
Figure 17:
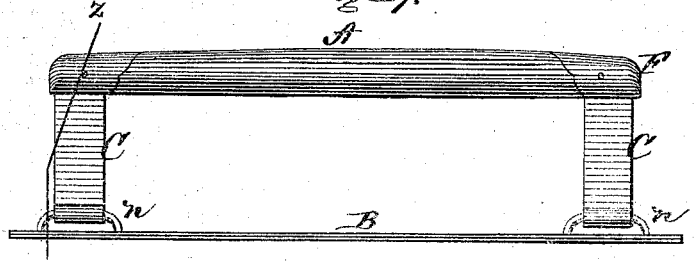

Fig. 17 being for cheap work, the handle A is made of metal or any cheap wood and stained, varnished, painted, or japanned. The link C in this case is a straight narrow strip of metal, bent at the center, forming an eye, which turns or hinges on a loop or staple, $n$, forming a connection with the frame B. The ends of the link C are brought together and inserted in a slot or mortise in the end of the handle A, and riveted to it. If a better finish is desired the cap F with a slot on the under side may be slipped on the end and riveted on at the same time with the link, as shown in Fig. 16, which is a cross-section of Fig. 17 on the line Z Z. When made of sheet iron or tin the handle and link may be made in one or made separate and put together as the others are.

Figure 14:
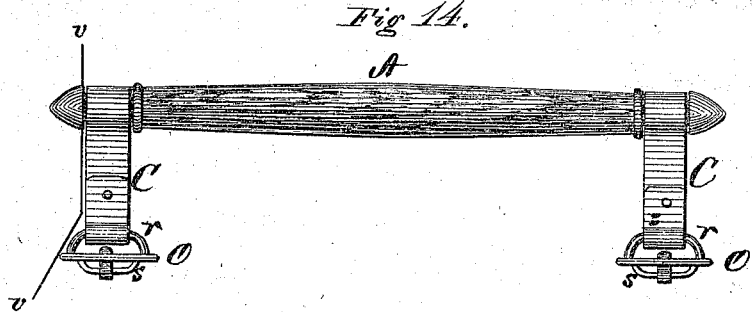
Figure 15:
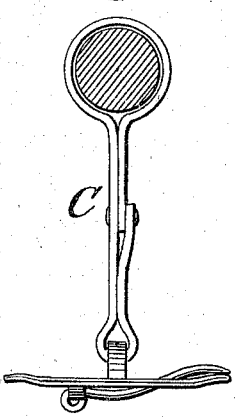

Fig. 14 shows a handle, A, connected by links C to pendent buckles O or loops, and having a jointed connection therewith, and to which are to be attached straps, making a cheap, durable, and convenient shawl or bundle carrier. The buckles O are formed of sheet metal, the body of the buckle and bridge $r$ and loop $s$ all being struck up out of sheet metal and in one piece by means of proper dies; or the bridge $r$ may be made of wire and attached to the body of the buckle by riveting or any other suitable method.

Figs. 19 and 20 show ornamental ends of metal or other material, which may be screwed or riveted on the ends of handle A.

I do not confine myself to the style of ornaments here shown, as they may be made of any style or device that fancy may dictate.

As handles for bags and satchels are and have been made there is a great sameness and no variety of style or finish, except a slight difference in the length or thickness of the handle or color of the leather covering, cheap and fine bags all being of the same general style of handle; but by my invention or improvements an almost endless variety of styles and qualities of both handles and connections can be made, either as plain or ornamental, as cheap or expensive as the manufacturer may desire, thus forming a new article of manufacture that is both useful and ornamental.

Having thus fully described my invention, what I claim as new, and desire to secure by Letters Patent, is—

1. A rigid handle, with its metal-plate connections, in combination with hinges or loops on a traveling-bag or valise frame, substantially as set forth.

2. Ornamental ends made separate from and for attachment to a rigid handle for a bag, satchel, or valise, substantially as herein set forth.

3. The caps F H, inclosing the ends of and forming the link-connections for the handle A, hinged to a bag or satchel frame, substantially as shown and described.

4. The combination of a rigid handle, A, links C or their equivalents, and buckles O, substantially as and for the purposes herein set forth.

JAMES S. TOPHAM.

Witnesses:
C. M. ALEXANDER,
C. L. EVERT.